Figure 2:
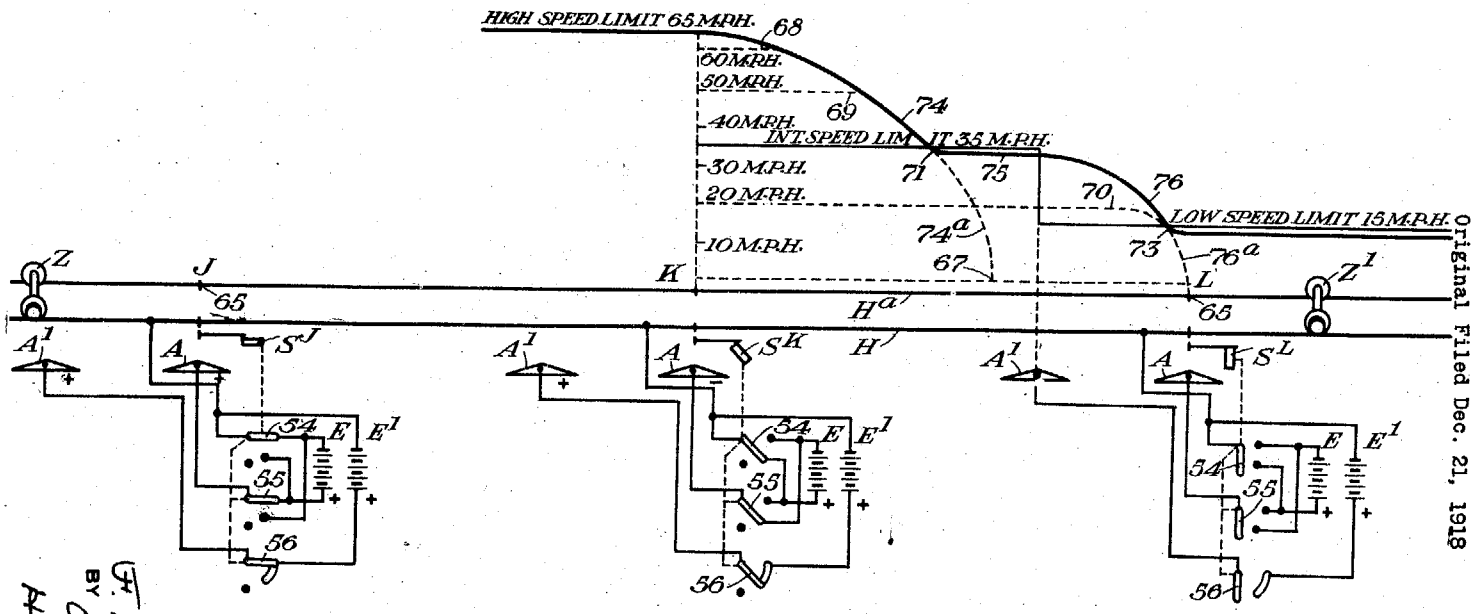

May 26, 1925. Re. 16,083
F. H. NICHOLSON
RAILWAY TRAFFIC CONTROLLING APPARATUS
Original Filed Dec. 21, 1918 3 Sheets-Sheet 1
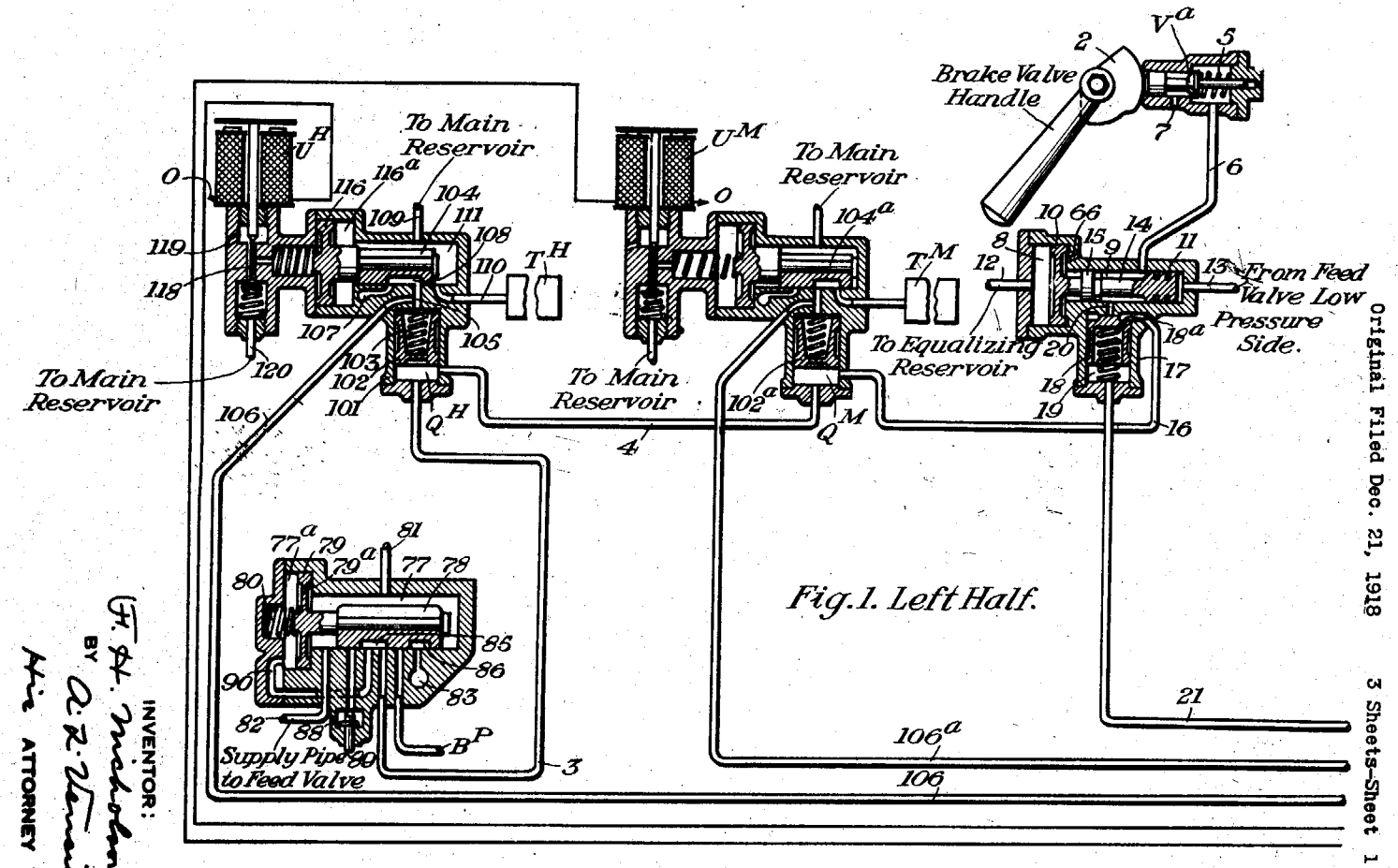
INVENTOR:
F. H. Nicholson
BY A. R. Vernell
His ATTORNEY

May 26, 1925. Re. 16,083
F. H. NICHOLSON
RAILWAY TRAFFIC CONTROLLING APPARATUS
Original Filed Dec. 21, 1918 3 Sheets-Sheet 2
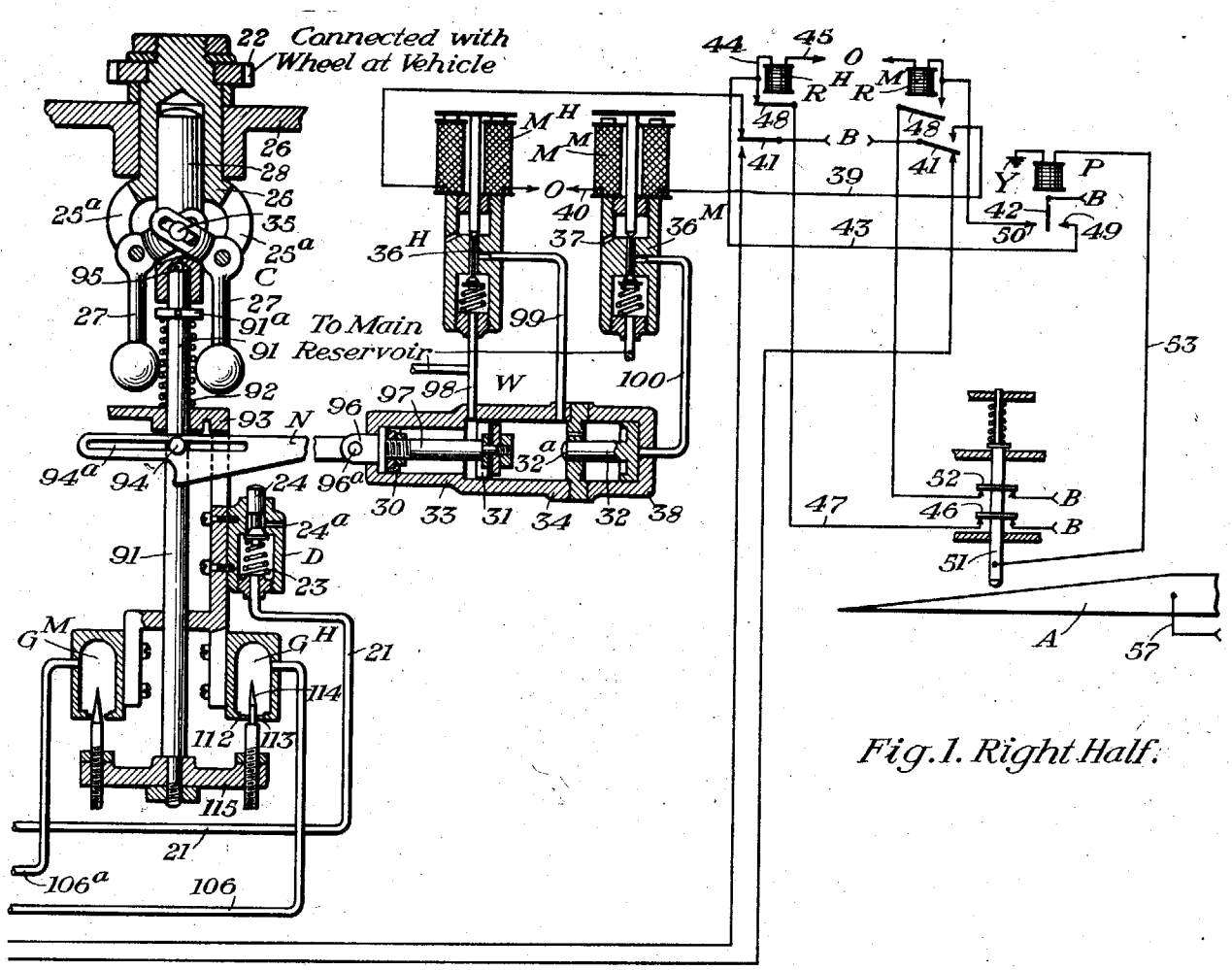
Fig. 1. Right Half.
INVENTOR:
F. H. Nicholson
BY A. R. Venzill
His ATTORNEY May 26, 1925.

Re. 16,083

F. H. NICHOLSON

RAILWAY TRAFFIC CONTROLLING APPARATUS

Original Filed Dec. 21, 1918 3 Sheets-Sheet 3

INVENTOR:
F. H. Nicholson
BY A. L. Venzill
His ATTORNEY

Reissued May 26, 1925. Re. 16,083

UNITED STATES PATENT OFFICE.

FRANK H. NICHOLSON, OF PHILADELPHIA, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Original application filed December 21, 1918, Serial No. 267,773. Renewed July 14, 1921, Serial No. 484,759. Original No. 1,405,552, dated February 7, 1922. Application for reissue filed August 28, 1924. Serial No. 734,809.

*To all whom it may concern:*

Be it known that I, FRANK H. NICHOLSON, a citizen of the United States, residing at Philadelphia, in the county of Philadelphia and State of Pennsylvania, have invented certain new and useful Improvements in Railway-Traffic-Controlling Apparatus, of which the following is a specification.

My invention relates to railway traffic controlling apparatus, and particularly to speed controlling apparatus for railway cars or trains.

One feature of my invention is the provision of means on a railway vehicle for applying the brakes when a restrictive indication is received from the trackway if the speed of the vehicle is above a fixed submaximum value, and means for delaying the operation of such apparatus, after the restrictive indication is received, for a distance of vehicle travel which depends on the speed, the lower the speed the greater being the distance which the vehicle will travel before the brake application occurs.

I will describe one form of apparatus embodying my invention, and will then point out the novel features thereof in claims.

In the accompanying drawings, Fig. 1 (two sheets) is a view, partly in section and partly diagrammatic, showing one form of vehicle-carried apparatus embodying my invention. Fig. 2 is a diagrammatic view showing one form of trackway apparatus which may be employed to control the vehicle-carried apparatus shown in Fig. 1, and also showing curves illustrating the operation of the apparatus shown in Fig. 1 under various conditions.

Similar reference characters refer to similar parts in each of the views.

Referring first to Fig. 1, it is understood that all of the apparatus shown herein, except a contact rail A, is carried by a railway vehicle, such as a car or locomotive, and that such vehicle is provided with a braking system of the usual fluid pressure type. The only part of this braking system which is shown in the drawing, however, is the operating handle of the engineer's brake valve, this part being designated "brake valve handle." Attached to this handle is a cam 2 which controls a valve $V^a$, this valve being biased to the closed position by a spring 5. The cam is so designed that valve $V^a$ is open when the valve handle is in "running," "release" and "lap" positions, but closed when the handle is in "service" or "emergency" position. When the valve $V^a$ is open, it opens a pipe 6 to atmosphere through a port 7.

The reference character V designates a valve device comprising a larger cylinder 8 and a smaller cylinder 9 in axial alignment. The larger cylinder is connected with the equalizing reservoir of the braking system through a pipe 12, and the smaller cylinder 9 is connected with the low pressure side of the feed valve of the braking system through a pipe 13. The larger cylinder contains a piston 10, and the smaller cylinder contains two pistons 11 and 15, all three of these pistons being rigidly connected by a rod 14 so that they move in unison. When the brakes are released, the pressure on the low pressure side of the feed valve is, of course, substantially the same as that in the equalizing reservoir, hence at such time the three pistons 10, 15 and 11 are moved to the extreme right owing to the fact that the area of piston 10 is greater than that of piston 11, and because the chamber between pistons 10 and 15 is connected to atmosphere through a port 66. When a service application of the brakes is made, however, the pressure in the equalizing reservoir is reduced while that on the low pressure side of the feed valve remains substantially the same as before. The relative areas of the pistons are such that when the pressure in the equalizing reservoir is reduced by an amount corresponding to a predetermined brake application, such as, for example, a reduction of 15 lbs. from its initial pressure, the actual pressure on piston 11 exceeds that on piston 10 so that the pistons then move to the left. When the pistons are at the extreme right, as shown in the drawing, the pipe 6 is opened to cylinder 9 between pistons 11 and 15, but when the pistons move to the left piston 11 covers the port by which pipe 6 enters the valve body and so disconnects this pipe from cylinder 9.

Reference character 16 designates a pipe the right-hand end of which leads into the upper end of a cylinder 17 which is integral with the casing of the valve device V. The upper end of the cylinder 17 also communicates with cylinder 9 by a port 20 which is so located that it is always between pistons 11 and 15 regardless of the position of these parts. The connection between pipe 16 and port 20 is, however, controlled by a plunger 18 in such manner that when this plunger is in its uppermost position, as shown in the drawing, it disconnects pipe 16 from port 20, but that when the plunger moves downwardly pipe 16 is opened to port 20 and so to cylinder 9. The lower end of the cylinder 17 is connected with a pipe 21, which is normally closed but which may at times be opened to atmosphere by means hereinafter explained. The plunger 18 is provided with a port $18^a$ of small area, so that normally the same pressure exists on both the upper and the lower sides of this plunger. At such times the plunger occupies its uppermost position owing to the action of a spring 19. If, however, pipe 21 is opened to atmosphere, the pressure on the upper surface of the plunger overbalances the pressure exerted by the spring 19 so that the plunger moves downwardly and connects pipe 16 with port 20.

Pipe 16 leads to a valve $Q^M$, hereinafter explained, which valve is normally open, as shown, so that this pipe is connected with a pipe 4. The latter pipe enters a second valve $Q^H$ which is also normally open so that pipe 4 is connected with a pipe 3. This pipe leads to a brake application valve device F which is constructed as follows:

The valve device F comprises a chamber 77 in which is a slide valve 78. The slide valve is controlled by a piston 79 which is rigidly connected with the valve and which operates in a cylinder $77^a$ integral with the body of the valve. The valve chamber 77 is constantly connected with the main reservoir of the braking system through a pipe 81. When the slide valve occupies its extreme right hand position, as shown in the drawing, the main reservoir is connected with the supply pipe of the feed valve of the braking system through a pipe 82, so that the brakes are then under the control of the operator of the vehicle; but when the slide valve is shifted to the left it covers the port leading to pipe 82 and so disconnects the feed valve from the main reservoir, whereby the operator can not then release the brakes by manipulation of his brake valve handle. B. P. represents a pipe opening into the seat on which the slide valve operates, and which pipe leads to the train pipe of the braking system. When the slide valve is in the position shown, it covers the pipe B. P. so that no automatic application of the brakes can occur. When the slide valve moves to the left, however, a cavity 86 in the slide valve connects the pipe B. P. with an exhaust port 83, so that the pressure in the brake pipe is reduced and an automatic application of the brakes occur.

The slide valve 78 and piston 79 are biased to the right by a spring 80, so that when the air pressures on the two sides of the piston are equal, the slide valve occupies its right hand position, as shown. The air pressures on the two sides of this piston are equal when pipe 3 is closed, for the following reason: Main reservoir pressure is constantly exerted on the right hand side of the piston, and the piston is provided with a small port $79^a$ through which the main reservoir pressure may flow to the left hand side of the piston. The left hand end of cylinder $77^a$ is normally connected with pipe 3 through a port 90 and a cavity 85 in the slide valve. When, therefore, pipe 3 is closed, the air pressures on the two sides of the pistons are equal so that the slide valve occupies its right hand position owing to the influence of spring 80.

I will now assume that pipe 16 is opened to atmosphere through valve V, pipe 6 and valve $V^a$, as hereinbefore explained, and that valves $Q^H$ and $Q^M$ are open, as shown. This causes a reduction in pressure on the left hand side of piston 79, so that the pressure on the right hand side of this piston is then sufficient to move the piston and the slide valve 78 to the left against the action of spring 80. This movement of the slide valve opens pipe B. P. to atmosphere through the exhaust port 83 and so causes an automatic application of the brakes. This movement of the slide valve also disconnects the feed valve supply pipe 82 from the main reservoir and so removes the control of the brakes from the operator of the car or train. This movement of the slide valve, furthermore, disconnects pipe 3 from port 90 and connects port 90 with a port 87, which is normally opened to atmosphere, through an exhaust port 88. The left hand end of cylinder $77^a$ is then connected with atmosphere through this exhaust port, so that the slide valve remains in its left hand position until the exhaust of air from port 87 is discontinued. This exhaust may be discontinued by means of a push button valve 89, which is located in such position on the vehicle as to require that the operator shall leave his cab and descend to the ground in order to operate the valve. It follows, therefore, that once an automatic application of the brakes has occurred, the vehicle must come to a full stop before the brakes can be released. That is, the construction of this valve device "F" is such that after it has once been moved to brake applying position, pipe 16 may be disconnected from atmosphere without affecting the position of the slide valve 78, and this slide valve can only be returned to its initial position by the operation of the push button 89.

Assuming for present purposes that valves $Q^M$ and $Q^H$ are open as shown, so that pipe 16 is connected with pipe 3, the operation of the apparatus thus far described is as follows:

As long as pipe 21 is closed, plunger 18 remains in uppermost position, so that pipe 16 is closed and no automatic application of the brakes occurs. When, however, pipe 21 is opened to atmosphere, plunger 18 moves downwardly so that pipe 16 is connected with cylinder 9 of valve device V. If the pistons 10, 15 and 11 of this valve device are in the positions shown, air can flow from pipe 16 into pipe 6, and if valve $V^a$ is open, the air can pass through this valve and out to atmosphere through port 7. Under such conditions, therefore, the pressure in pipes 16, 4 and 3 is reduced so that an automatic application of the brakes is effected by valve device F. If, however, when pipe 21 is open to atmosphere, the brake valve handle is in the service or emergency position, valve $V^a$ is closed so that the exhaust of air from pipe 16 is prevented at this point. Furthermore, if the equalizing reservoir pressure has already been reduced by such an amount as to cause the predetermined service application of the brakes, pistons 10, 15 and 11 will have been moved to the extreme left, thereby disconnecting pipe 6 from pipe 16, so that the reduction of pressure in pipe 16 will be prevented by piston 11, and valve device F will not be affected. It will be seen, therefore, that operation of valve device F is prevented if the brake valve handle is in service or emergency position, or if an application of the brakes of at least the predetermined amount is already in effect; and it will furthermore be seen that if the predetermined service application is already in effect, the brake valve handle may be returned to the lap position and the operation of the brake valve device F will still be prevented.

Pipe 21 leads to a valve D which is normally closed but which may be opened at times by means hereinafter explained, so that pipe 21 is then opened to atmosphere. As long as valve D is closed, the plunger 18 remains in its uppermost position, when, however, the valve D is opened, pipe 21 is opened to atmosphere, whereupon plunger 18 moves downwardly owing to the reduction in the air pressure on its under side.

It will, of course, be observed that when valve D is opened, pipe 16 is connected with atmosphere through the port $18^a$ and pipe 21, even though piston 11 covers the opening to pipe 6 or valve $V^a$ is closed. The area of port $18^a$ is so small, however, that the rate of exhaust through this port is not sufficient to cause an automatic application of the brakes.

The valve D is biased to the closed position by a spring 23 and by the action of the air pressure in pipe 21 on the under side of the valve. This valve may be opened, however, by the action of a cam N against a head 24 attached to the stem of the valve, and when this occurs pipe 21 is opened to atmosphere through a port $24^a$ in the valve body. The cam N is shifted in a substantially vertical path by a speed responsive device C, and in a substantially horizontal path by a device W which imposes certain speed limits on the vehicle in accordance with traffic conditions in advance. These two devices which control cam N will be described separately.

The speed responsive device C, which, as here shown, is in the form of a centrifuge, comprises a shaft 25 which is journalled in a bearing 26 and which is operatively connected with a wheel of the vehicle through the medium of a gear wheel 22, so that this shaft rotates at a speed which is proportional to the actual speed of the vehicle. The shaft 25 is provided with diametrically disposed yokes $25^a$ in which are pivotally mounted the two bell cranks 27 of the centrifuge. The inner arms of these cranks are slotted to receive a pin 35 passing through a rod 28, which rod is guided by shaft 25 and is free to reciprocate vertically therein. The lower end of rod 28 is provided with an axial recess which receives the upper end of a second vertically disposed rod 91, the two rods being separted by a ball bearing 95. Rod 91 passes freely through guide holes in a bracket 93 which is attached to the frame of the vehicle, and to which bracket the valve D is attached. The lower end of this rod controls two valves $G^M$ and $G^H$, the structure and function of which will be explained hereinafter. Rod 91 is provided with a pin 94 which passes through a horizontal slot in the cam N. The centrifuge C is biased to the closed position by a spring 92 which abuts against the bracket 93 and a collar $91^a$ attached to rod 91, but when the vehicle is in motion the centrifuge opens to an extent proportional to the speed of the vehicle. The vertical position of rod 91 depends, then on the actual speed at which the vehicle is moving. Cam N is pivoted at point $96^a$ in a head 96 forming part of the device W. It will be seen, then, that vertical movements of rod 91 will shift the cam around its pivotal point $96^a$ as a center, and that the distance which the cam is shifted from its uppermost position is substantially proportional to the actual speed of the vehicle.

The speed limit device W comprises three cylinders 33, 34 and 38 in axial alignment, which cylinders are provided with pistons 30, 31 and 32 respectively. Pistons 30 and 31 are rigidly connected by a rod 97, which rod carries the head 96 to which the cam N is pivotally attached. It will be seen, therefore, that longitudinal movements of these two pistons will cause the cam to be shifted in a horizontal path. Air pressure from a suitable source, such as the main reservoir of the braking system, is constantly supplied to the left-hand end of cylinder 34 and to the right-hand end of cylinder 33 by a pipe 98, and owing to the difference in the sizes of pistons 30 and 31 this pressure alone biases these two pistons to the right. Entering the right-hand end of cylinder 34, however, is another pipe 99 to which air pressure is at times supplied from the same source. When this occurs, the pressure on the opposite sides of piston 31 are opposite and equal, so that the two pistons 30 and 31 and the cam N are then shifted to the extreme left, that is, to the positions shown in the drawing, by the air pressure on piston 30. The pistons and cam are then in what I will term their "high speed position." Air pressure is at times supplied to the right-hand end of cylinder 38 from the same source by a third pipe 100. If, then, pipe 99 is opened to atmosphere, piston 32 will move to the extreme left and pistons 30 and 31 and cam N will move to the right until they are stopped by a rod $32^a$ projecting from piston 32, and so the cam N will then occupy an intermediate position. The pistons and cam then occupy what I will term their "intermediate speed position." If pipes 99 and 100 are both opened to atmosphere, pistons 30 and 31 will move to the right, and will move piston 32 to the right also, so that pistons 30 and 31, and the cam will then occupy extreme right-hand positions, which I will term their "low speed position."

The cam N is so designed and proportioned that when it is in the extreme left or "high speed position," if the actual speed of the vehicle exceeds a predetermined high speed, such as 65 miles per hour, the lower surface of the cam will press downward on stem 24 of valve D and will open this valve. When the cam N is in its "intermediate speed position," if the speed of the vehicle exceeds an intermediate value, such as 35 miles per hour, the valve D will be opened. When the cam N is in the extreme right or "low speed position," valve D will be opened if the speed of the vehicle exceeds a low value, such as 15 miles per hour.

The supply of air from the main reservoir to pipe 100 is controlled by a valve $36^M$, which in turn is controlled by an intermediate speed magnet $M^M$. This magnet and valve are so arranged that when the magnet is de-energized the valve disconnects the pipe 100 from the main reservoir and connects this pipe with atmosphere through an exhaust port 37; but that when the magnet is energized the valve connects the pipe 100 with the main reservoir and closes the exhaust port.

The supply of fluid pressure to the pipe 99 is controlled in a similar manner by a valve $36^H$ and a high speed magnet $M^H$.

The intermediate speed magnet $M^M$ is controlled by an intermediate speed relay $R^M$, the circuit being from one terminal B of a source of current, through the upper point of contact 41 of relay $R^M$, wire 39, magnet $M^M$, and wire 40 to the other terminal O of the source of current. The source of current itself and the parts of the circuit which do not pass through the parts of the apparatus shown in the drawing are omitted for the sake of simplicity. It will be seen that magnet $M^M$ is energized or de-energized according as relay $R^M$ is energized or not. The high speed magnet $M^H$ is similarly controlled by the upper point of a contact 41 of a high speed relay $R^H$, the circuit for this magnet being obvious from the drawing. The relays $R^H$ and $R^M$ are controlled by a polarized relay P in such manner that one relay or the other is energized according as armature contact 42 of the relay P is swung in one direction or the other. The circuit for relay $R^H$ is from one terminal B of a source of current through contact 42—49 of relay P, wires 43 and 44, relay $R^H$ and wire 45 to the other terminal O of the source of current. The corresponding circuit for relay $R^M$ is controlled by contact 42—50 of polarized relay P, and will be obvious from the drawing.

The circuits which have just been traced for relays $R^H$ and $R^M$ are in the nature of pick-up circuits, and are merely for the purposes of preliminary energization of these relays. Each relay is further provided with a holding circuit including a contact controlled by a shoe 51 which is arranged to coact with ramp rails A located in the trackway. This shoe 51 controls two contacts 46 and 52 which contacts are normally closed but are opened each time that shoe 51 is raised by a ramp rail A. The holding circuit for relay $R^H$ is from one terminal B of a source of current, through contact 46, wire 47, contact 48 of relay $R^H$, wire 44, winding of relay $R^H$, and wire 45 to the other terminal O of the same source of current. The circuit for relay $R^M$ is controlled by contact 52 and by a contact 48 of the relay itself, and will be obvious from the drawing without further explanation.

One terminal of the polarized relay P is connected with a wheel or axle of the vehicle at the point indicated by the reference character Y, while the other terminal of this relay is connected with the shoe 51 by means of a wire 53. Means are provided in the trackway, as hereinafter explained, for at times connecting a suitable source of current with ramp rail A and a track rail of the railway. It follows that when the shoe 51 engages with ramp rail A, relay P will be energized in one direction or the other according as the positive terminal of the last-mentioned source of current is connected with the ramp rail A or with the track rail; obviously, if this source of current is not connected with both the ramp rail and the track rail, relay P will remain de-energized. I will assume for purposes of discussion that when the positive terminal of the trackway source is connected with the ramp rail A, relay P is energized in such direction as to close contact 42—49 and so to energize the high speed relay $R^H$.

The valve $Q^H$, referred to hereinbefore, comprises a cylinder 101 containing a plunger 102. When this plunger is in its uppermost position, as shown in the drawing, pipe 3 is connected with pipe 4, but when the plunger moves downwardly it covers the opening to pipe 4 and so prevents the flow of air from pipe 3 to pipe 4. Plunger 102 is biased downwardly by its own weight and by a spring 103, but is normally held in its elevated position in opposition to these forces by the action of the air pressure in pipe 3 on the underside of the plunger. The position occupied by the plunger is determined by the pressure on the upper side thereof, and this pressure is controlled in part by a slide valve 104 and in part by a timing valve $G^H$. The upper end of cylinder 101 is constantly connected with the valve $G^H$ through a port 105 and a pipe 106. When the slide valve 104 is in its left-hand position, as shown in the drawing, the upper end of cylinder 101 is opened to atmosphere through a cavity 108 in the valve and an exhaust port 107, so that plunger 102 is then elevated as shown. When the slide valve 104 is in this left-hand position, air from the main reservoir is supplied to a timing reservoir $T^H$ through a pipe 109, the chamber 111 in which valve 104 operates, and a pipe 110. If, now, slide valve 104 is shifted to the right, it will disconnect port 105 from the exhaust port 107; and it will also disconnect the timing reservoir $T^H$ from the source of air pressure and connect this reservoir with port 105. The pressure in the timing reservoir will then be applied to the top of plunger 102, and since this pressure added to the action of the spring 103 and the weight of the plunger will overbalance the air pressure on the under side of the plunger, the plunger will be shifted to its lowest position. The pressure in the timing reservoir will be gradually reduced, however, owing to the escape of air through the timing valve $G^H$, as hereinafter explained, and hence when this pressure reaches a certain value, as determined by the force exerted by spring 103, the plunger 102 will again rise. The time which will elapse before the plunger rises will depend on the rate of flow of air through the timing valve $G^H$, and this rate is determined as follows:

The timing valve $G^H$ comprises a chamber 112 into which the pipe 106 opens, and this chamber is provided with an opening 113 leading to atmosphere. Working in this opening 113 is a tapered stem 114 which is attached to a cross bar 115 mounted at the lower end of the centrifuge rod 91. The position of the stem 114 in the opening 113 depends, then, on the speed of the vehicle. When the vehicle is at rest or is running at less than the intermediate speed (35 miles per hour), the lower portion of the stem substantially closes the opening 113, but as the speed gradually increases above 35 miles per hour, the tapered portion of the stem passes down through the opening and so forms an annular orifice of gradually increasing area. The shape of stem 114 is such that when the speed of the vehicle is above 35 miles per hour and the timing reservoir $T^H$ is connected with the timing valve $G^H$, the pressure in the reservoir changes from the initial value (main reservoir pressure) to an ultimate value (at which plunges 102 rises) in a time interval which depends on the actual speed of the vehicle and the variation of this time interval in accordance with speed is such that the lower the speed the greater the distance the vehicle will travel before plunger 102 rises. At 65 miles per hour the opening to atmosphere from valve $G^H$ is maximum, and the pressure in the reservoir $T^H$ then reaches its ultimate value almost instantly.

Returning now to the valve $Q^H$, the position of the slide valve 104 is controlled by a piston 116 rigidly connected with the slide valve and operating in a cylinder $116^a$. This piston and the slide valve are biased to the right by a spring 117, but when no other force acts on the left-hand side of the piston the action of this spring is overbalanced by the main reservoir air pressure on the right-hand side of the piston so that the slide valve is held in its extreme left-hand position as shown. The pressure on the left-hand side of piston 116 is governed by a double valve 118, which in turn is controlled by a magnet $U^H$, the control being such that when the magnet is de-energized the left-hand end of cylinder 116 is opened to atmosphere through a port 119, but that when the magnet is energized this end of the cylinder is disconnected from atmosphere and is connected with the main reservoir of the braking system through a pipe 120. Under this last-mentioned condition, the air pressures on the two sides of piston 116 are balanced, so that this piston and the slide valve 104 are shifted to the right by spring 117.

Magnet $U^H$ is provided with a circuit which is controlled by the lower point of contact 41 of high speed relay $R^H$, so that when this relay is energized, magnet $U^H$ is deenergized, and vice-versa.

Valve $Q^M$ is governed by a timing reservoir $T^M$, a timing valve $G^M$, and a magnet $U^M$, which parts are similar in all respects to the corresponding parts which govern valve $Q^H$, except as to valve $G^M$. The parts of this valve $G^M$ are so proportioned that when the vehicle is at rest this valve is substantially closed, when the vehicle is running at 35 miles per hour, the valve is wide open, and that at speeds between these two limits the area of opening of this valve varies in such manner that the lower the speed the greater the distance which the vehicle will travel before plunger $102^a$ rises. Magnet $U^M$ is controlled by relay $R^M$ in the same manner as magnet $U^H$ is controlled by relay $R^H$. As shown in the drawing, relay $R^M$ is de-energized, so that magnet $U^M$ is energized. Plunger $102^a$ is in the elevated position, however, because it is assumed that slide valve $104^a$ has been in the right-hand position long enough for the pressure in the timing reservoir $T^M$ to become reduced substantially to atmospheric value due to the flow of air through valve $G^M$.

Referring now to Fig. 2, the reference characters H and $H^a$ designate the track rails of a railway along which traffic normally moves in the direction indicated by the arrow. These rails are divided by suitable means, such as by insulated joints 65, into a plurality of successive block sections J—K, K—L, etc. Located adjacent the entrance of each block is a signal which is designated by the reference character S with an exponent corresponding to the location of the signal. The controlling means for these signals forms no part of my invention, and hence is omitted from the drawing for the sake of simplification. Each signal is so controlled as to indicate "stop" when the corresponding block is occupied, "caution" when the corresponding block is unoccupied and the block next in advance is occupied, and "proceed" when the corresponding block and the block next in advance are both unoccupied, for example, as shown in Fig. 2, the block immediately in advance of location L is occupied by a vehicle Z′, so that signal $S^L$ indicates "stop," signal $S^K$ indicates "caution," and signal $S^J$ indicates "proceed."

Located at or near the entrance end of each block is a ramp rail A, and located in the rear of each ramp rail A is a second ramp rail A′. Each ramp rail A′ is located in the rear of the adjacent signal a distance equal to maximum braking distance for trains travelling at 35 miles per hour, plus a factor of safety, as may be required. Each of these ramp rails is arranged to coact with the vehicle-carried shoe 51, shown in Fig. 1, in such manner that the shoe is elevated to open contacts 46 and 52 each time that the shoe passes over one of these rails. Current is at times supplied to each ramp rail A by an adjacent source of current E, and, similarly, current is at times supplied to each ramp rail A′ by an adjacent source E′. Considering first ramp A, the supply of current therefore is controlled by contacts 54 and 55 operated by the adjacent signal S, the control being such that when the signal indicates "proceed" (see signal $S^J$), the positive terminal of the source E is connected with the ramp rail A and the negative terminal with the lower track rail H; but that when the signal indicates "caution" (see signal $S^K$), the polarity is reversed, so that the negative terminal of the source E is connected with ramp rail A and the positive terminal with the track rail H. When the signal indicates "stop" (see signal $S^L$), the source E is disconnected from ramp rail A so that this rail is then dead.

The connection between each battery E′ and the corresponding ramp rail A′ is controlled by a contact 56 operated by the adjacent signal, the control being such that the positive terminal of the battery is connected with the ramp A′ when the adjacent signal indicates "proceed" or "caution," but that the connection is broken when the signal indicates "stop."

The operation of the entire apparatus is as follows:

Referring first to Fig. 2, I will assume that while the vehicle Z′ is in the position shown on the drawing, a second vehicle Z equipped with the apparatus shown in Fig. 1, approaches block J—K, and that the parts of the apparatus on this second vehicle are in the positions shown in Fig. 1. As this second vehicle passes over ramp rail A′ in the rear of location J, the shoe 51 will be elevated to open the holding circuit of the high speed relay $R^H$, but at the same time polarized relay P will be energized in such direction as to close the pick-up circuit for this relay, because the positive terminal of the adjacent source E′ is connected with this ramp rail. Then as the shoe 51 passes off of rail A′, the holding circuit for this relay $R^H$ will be closed at contact 46. High speed magnet $M^H$ consequently remains energized, so that the vehicle can proceed at 65 miles per hour or less. Ramp rail A at location J is connected with the positive terminal of its battery E, so that the same operation takes place as the vehicle passes over this ramp rail. The vehicle may then proceed into block J—K at full speed. Rail A′ immediately in the rear of location K is connected with the positive terminal of its battery E′, so that the same operation again takes place as the vehicle passes over this ramp rail. Ramp rail A at location K is, however, connected with the negative terminal of its battery E, so that as the vehicle passes over this ramp rail, polarized relay P will be energized in such direction as to close the pick-up circuit for the intermediate speed relay $R^M$. The high speed relay $R^H$, of course, becomes energized, because its holding circuit is opened at contact 46. The opening of relay $R^H$ causes the high speed magnet $M^H$ to become de-energized, so that the supply of air to pipe 99 is discontinued and this pipe is opened to atmosphere. The intermediate speed magnet $M^M$ becomes energized, however, so that air is supplied to the cylinder 38 through pipe 100, thereby moving piston $32^a$ to the left. Cam N is then moved to the right until it is stopped and held in its "intermediate speed" position by piston rod $32^a$. If the vehicle is then travelling at a speed higher than 35 miles per hour, this cam will open valve D, whereupon plunger 18 will descend, thus opening pipe 16 to the interior of cylinder 9. The de-energization of relay $R^H$ causes magnet $U^H$ to become energized, so that slide valve 104 is shifted to the right, thus connecting reservoir $T^H$ with the upper end of cylinder 101. Plunger 102 will then move downwardly and so will disconnect pipe 3 from pipe 4. Of course, the parts must be so designed that valve $Q^H$ will close before plunger 18 descends. If the speed of the vehicle is 65 miles per hour at this time, valve $G^H$ will be wide open, so that the pressure in reservoir $T^H$ will almost instantly decrease to its ultimate value, that is, to such value that plunger 102 will again rise. When this occurs, if valves V and $V^a$ are still open, pipe 3 will be opened to atmosphere through pipes 4, 16, etc., and so the valve device F will operate to cause an automatic application of the brakes. The speed will then be reduced in substantial accordance with curves 74 and $74^a$ in Fig. 2, and will stop at point 67. If, however, the engineer recognizes the indication given by signal $S^K$ and moves his brake valve handle to service position at or just before the moment that shoe 51 engages ramp rail A, pipe 6 will be disconnected from atmosphere by valve $V^a$ and so an automatic application of the brakes will be prevented. Assuming that the engineer operates the brake valve handle as just described, then after the predetermined service brake application has been effected, the pistons 10, 15 and 11 of the valve device V will move to the left, so that the engineer may thereupon return his brake valve handle to the lap position and the automatic brake application will still be prevented. The speed of the vehicle will then be gradually reduced substantially in accordance with the curve 74, and when the speed is reduced to slightly under 35 miles per hour, cam N will allow valve D to close, so that plunger 18 will rise; the engineer may then release the brakes by the proper manipulation of his brake valve handle and the vehicle may proceed at a speed of 35 miles per hour or less, as indicated by line 75 until ramp rail A′ is reached. That is, the engineer may release the brakes at the point 71 in Fig. 2 or shortly thereafter, without causing an automatic brake application. I will now assume that when the vehicle passes point K its speed is 60 miles per hour. The area of the orifice of valve $G^H$ will then be less than before, so that an appreciable time interval will elapse before plunger 102 will rise; that is, valve $Q^H$ will not connect pipe 3 with pipe 4 until the vehicle reaches the point 68 in Fig. 2. If, upon reaching this latter point, the engineer fails to apply the brakes, valve device F will act to cause an automatic application, whereupon the vehicle will again be brought to rest at substantially the point 67. If, however, the engineer manipulates the brake valve handle to cause a brake application at or just before the vehicle reaches the point 68, pipe 6 will be disconnected from atmosphere and so the automatic application will be prevented. If the engineer effects the predetermined brake application and then moves his brake valve handle to the lap position, the speed of the vehicle will be gradually reduced in accordance with the curve 74, and the brakes may be released as before at point 71. If the speed of the vehicle at point K is 50 miles per hour, the automatic application will be delayed until the vehicle reaches point 69, so that the engineer may delay the manual application until just before the vehicle reaches this point, and may release the brakes at point 71. It follows, then, that the lower the speed of the vehicle at location K, the greater will be the time interval before the automatic brake application occurs, and so the greater will be the distance which the vehicle may proceed into the block before it is necessary for the engineer to cause a manual application of the brakes. Assuming that a manual application is always made just before an automatic application would occur, it follows that regardless of the speed of the vehicle it will always be reduced to a speed of 35 miles per hour at substantially the point 71, and that the brakes may then be released at the latter point.

Ramp A′ in the rear of point L is disconnected from its source of current so that as the shoe 51 passes over this ramp rail, the intermediate speed relay $R^M$ will become de-energized. This causes de-energization of the intermediate speed magnet $M^M$, so that the right-hand end of cylinder 38 is disconnected from the supply of air and is connected with atmosphere. Cam N then moves to its extreme right-hand or "low speed" position. If the vehicle is then travelling at 15 miles per hour or more, the cam N will again open valve D, whereupon plunger 18 will again move downwardly to connect pipe 16 with the interior of valve device V. The energization of relay $R^M$ at location K has caused magnet $U^M$ to become de-energized, so that slide valve $104^a$ has been returned to its left-hand position, thus permitting timing reservoir $T^M$ to become charged to full pressure from the main reservoir. On reaching ramp rail A′ in the rear of signal $S^L$, relay $R^M$ again becomes de-energized, thus causing energization of magnet $U^M$, which in turn causes the slide valve $104^a$ to be shifted to the right. The pressure in timing reservoir $T^M$ is then applied to the upper surface of plunger $102^a$, so that this plunger descends prior to the descent of plunger 18. If the speed of the vehicle at ramp rail A′ is 35 miles per hour, the timing valve $G^M$ will be wide open, so that the pressure in reservoir $T^M$ will be reduced to its ultimate value almost instantly, whereupon plunger $102^a$ will again rise. If the engineer does not apply the brakes manually prior to this operation of plunger $102^a$, an automatic application of the brakes will occur, so that the speed of the vehicle will be reduced substantially in accordance with curves 76 and $76^a$, whereupon the vehicle will be brought to a stop at point 65, that is, at or in the rear of signal $S^L$. If, however, at or just prior to the instant that shoe 51 contacts with ramp rail A′ the engineer moves his brake valve handle to the service position, the automatic application of the brakes will be prevented and the brake valve handle can be returned to the lamp position after the predetermined service application has become effective. The speed of the vehicle will then be reduced substantially in accordance with curve 76 and when the point 73 is reached, that is, when the speed of the vehicle is reduced to 15 miles per hour, the brakes may be released and the vehicle may proceed at 15 miles per hour or less into the block occupied by the vehicle Z′. Assuming now that the speed of the vehicle at ramp rail A′ is only 20 miles per hour, the area of the orifice of valve $G^M$ is considerably less than before, so that plunger $102^a$ will not rise until the vehicle reaches point 70. If the engineer causes a manual application of the brakes at or before point 70 is reached, the automatic application will be prevented and the brakes may again be released at point 73. It will thus be seen that the lower the speed of the vehicle at ramp rail A′, the farther the vehicle may proceed beyond this point before it is necessary for the engineer to move the brake valve handle to avoid an application of the brakes. It follows, then, that regardless of the speed of the vehicle (as long as it is between 15 and 35 miles per hour) at ramp rail A′, the engineer may by proper manipulation of the brake valve handle, control the train so that the speed will always be reduced to 15 miles per hour at substantially the point 73.

Of course, if the speed of the vehicle does not exceed 35 miles per hour between points K and A′, cam N will not open valve D, so that no automatic application of the brakes will occur between these points. Similarly, if the speed of the vehicle does not exceed 15 miles per hour between ramp rails A′ and A at location L, valve D will not be opened and so no automatic application of the brakes will occur.

While the vehicle Z is passing through block J—K, if the speed should at any instant exceed 65 miles per hour, cam N will open valve D and so will cause an automatic application of the brakes unless a manual application is made as soon as such speed is exceeded. In other words, the apparatus imposes a continuous high speed limit, as well as other limits, under given conditions.

Where, in the accompanying claims I have used the expression "danger conditions in advance", or expressions of like import, I refer to the conditions which exist when a vehicle enters the block in the rear of an occupied block, or when the vehicle passes ramp rail A′ in the rear of an occupied block, or when the vehicle enters an occupied block, or when the vehicle enters a stretch of track through which safety requires a speed lower than maximum. All other traffic conditions are known as "proceed" conditions.

Where, in the accompanying claims, I have used the expression "apparatus having a proceed or a danger condition", or expressions of similar nature, I refer to the apparatus W which imposes certain limits on the speed of the vehicle, the high speed condition of this apparatus being its proceed condition, and both the intermediate and the low speed conditions of this apparatus being danger conditions.

I do not in the present application claim the combination of automatic apparatus for applying the brakes, and manually operable means effective under certain conditions to prevent operation of said apparatus, such combination being disclosed and claimed in my co-pending application filed on the 12th day of September, 1918, Serial No. 253747, for railway traffic controlling apparatus.

I do not in the present application make any claim for the broad combination of automatic apparatus for applying the brakes and means for preventing the automatic apparatus from functioning if the brakes are applied by the operator of the vehicle, such combination being disclosed and claimed in my co-pending application, Serial No. 253747, filed on the 12th day of September, 1918, for railway traffic controlling apparatus.

Although I have herein shown and described only one form of apparatus embodying my invention, it is understood that various changes and modifications may be made therein within the scope of the appended claims without departing from the spirit and scope of my invention.

Having thus described my invention, what I claim is:

1. Railway traffic controlling apparatus comprising means on a vehicle controlled from the trackway for permitting maximum speed under clear traffic conditions in advance and for applying the brakes if the vehicle exceeds a fixed sub-maximum speed limit under restrictive traffic conditions in advance, and slow-acting means on the vehicle set into operation when an indication of restrictive traffic conditions is received for preventing operation of said brake-applying means for a distance of vehicle travel which varies with the speed of the vehicle in such manner that the lower the speed the greater is the distance.

2. Railway traffic controlling apparatus comprising means on a vehicle controlled from the trackway for applying the brakes if the vehicle exceeds a fixed sub-maximum speed limit under restrictive traffic conditions, and slow-acting means on the vehicle set into operation when a restrictive indication is received for preventing operation of said brake-applying means for a distance of vehicle travel which varies with the speed of the vehicle in such manner that the lower the speed the greater is the distance.

3. Railway traffic controlling apparatus comprising a railway vehicle, a fluid pressure reservoir thereon, means on the vehicle controlled from the trackway for varying the pressure in said reservoir at a rate dependent upon the speed of the vehicle when traffic conditions in advance are dangerous, and brake application means on the vehicle controlled by the pressure in said reservoir.

4. Railway traffic controlling apparatus comprising a railway vehicle, a fluid pressure reservoir thereon, means on the vehicle controlled from the trackway for maintaining a constant pressure in said reservoir or for initiating a change in said pressure according to traffic conditions in advance, means on the vehicle for causing the rate of variation of the pressure in said reservoir to be dependent upon the speed of the vehicle, and brake application means on the vehicle controlled by the pressure in said reservoir.

5. Railway traffic controlling apparatus comprising a railway vehicle, a fluid pressure reservoir thereon, means on the vehicle controlled from the trackway for maintaining a constant pressure in said reservoir or for initiating a change in said pressure according to traffic conditions in advance, means on the vehicle for causing the rate of variation of the pressure in said reservoir to be dependent upon the speed of the vehicle, and brake application means on the vehicle controlled by the pressure in said reservoir and set into operation upon the completion of a predetermined change of the pressure in the reservoir.

6. Railway traffic controlling apparatus comprising a vehicle, a fluid pressure reservoir thereon, an exhaust orifice, means on the vehicle controlled from the trackway for connecting said reservoir with a source of fluid pressure or with said orifice according to traffic conditions in advance, speed-responsive means on the vehicle for varying the area of said orifice, and brake application means on the vehicle controlled by the pressure in said reservoir.

7. Railway traffic controlling apparatus comprising means on a vehicle controlled from the trackway and operative when a restrictive indication is received to determine a fixed sub-maximum speed limit, a brake application device controlled by said means and set into operation if the vehicle exceeds said speed limit, and apparatus interposed between said means and said device for preventing application of the brakes for a distance of vehicle travel which varies with the speed of the vehicle in such manner that the lower the speed the greater is the distance.

8. Railway traffic controlling apparatus comprising means on a vehicle controlled from the trackway for giving a caution indication and a danger indication, apparatus on the vehicle for applying the brakes if the vehicle exceeds a fixed sub-maximum speed when the caution indication is received, and a lower fixed sub-maximum speed when the danger indication is received, a slow-acting device set into operation when said caution indication is received for delaying the brake application for a variable distance interval of vehicle travel depending on the vehicle speed, and a second slow-acting device set into operation when the danger indication is received for delaying the brake application for a variable distance interval of vehicle travel depending on the speed of the vehicle.

9. Railway traffic controlling apparatus comprising means on a vehicle controlled from the trackway for giving a caution indication and a danger indication, apparatus on the vehicle for applying the brakes if the vehicle exceeds a fixed sub-maximum speed when the caution indication is received, and a lower fixed sub-maximum speed when the danger indication is received, and slow-acting means set into operation when either of said indications is received for delaying the brake application for a variable distance interval of vehicle travel depending on the speed of the vehicle.

10. Railway traffic controlling apparatus comprising means on a vehicle controlled from the trackway for determining a fixed sub-maximum speed limit under restrictive traffic conditions, slow-acting apparatus set into action when a restrictive indication is received on the vehicle and requiring for its operation a distance of vehicle travel which varies with the speed of the vehicle in such manner that the lower the speed the greater is the distance, and a device on the vehicle for applying the brakes when the operation of said slow-acting apparatus is completed if the speed of the vehicle then exceeds said fixed limit.

11. Railway traffic controlling apparatus comprising a railway vehicle, means thereon controlled by the speed of the vehicle and arranged to change from an initial condition to an ultimate condition in a distance interval which varies with the speed of the vehicle in such manner that the lower the speed the greater the interval, brake application apparatus set into operation when said means reaches the ultimate condition, and means controlled from the trackway for setting said means into operation.

12. Railway traffic controlling apparatus comprising a railway vehicle, means thereon controlled by the speed of the vehicle and arranged to change from an initial condition to an ultimate condition in a distance interval which varies with speed in such manner that the lower the speed the greater the interval, apparatus on the vehicle for setting said means into operation under dangerous traffic conditions in advance, and brake application apparatus set into operation when said means reaches the ultimate condition if the speed of the vehicle then exceeds a fixed sub-maximum value.

13. Railway traffic controlling apparatus comprising a railway vehicle, means thereon controlled by traffic conditions in advance for imposing a fixed intermediate speed limit and a fixed low speed limit, brake application apparatus controlled by said means for applying the brakes if the vehicle exceeds said speed limits, and slow-acting means interposed between said means and said apparatus for delaying the operation of said brake application apparatus for a distance interval which depends upon the speed of the vehicle.

14. Railway traffic controlling apparatus comprising a vehicle, means thereon responsive to dangerous traffic conditions in advance for imposing a fixed speed limit on the vehicle, brake application apparatus controlled by said means for applying the brakes if the vehicle exceeds said fixed speed limit, and slow-acting means interposed between said means and said apparatus for preventing application of the brakes for a distance of vehicle travel which varies with the speed of the vehicle in such manner that the lower the speed the greater is the distance.

15. Railway traffic controlling apparatus comprising a vehicle, brake application apparatus thereon, a speed responsive device on the vehicle, a cam shifted in one path by said speed responsive device, means on the vehicle controlled by traffic conditions in advance for shifting said cam in another path to impose fixed speed limits on the vehicle, means on the vehicle controlled by said cam for setting said brake application apparatus into operation when the actual speed exceeds the permissive speed as determined by the position to which said cam is shifted by said means, and slow-acting means for delaying the operation of said brake application apparatus for an interval of distance which is dependent upon the speed of the vehicle.

16. Railway traffic controlling apparatus comprising a vehicle, automatic apparatus thereon controlled by traffic conditions in advance for causing an application of the brakes if the speed of the vehicle exceeds a fixed value under restrictive traffic conditions, means for delaying the application of the brakes regardless of vehicle speed for a variable distance of vehicle travel which depends on the speed of the vehicle, and means acting when the brakes have been applied manually by the operator of the vehicle for preventing an application by said automatic apparatus.

17. Railway traffic controlling apparatus comprising slow-acting means on a vehicle requiring for its operation a variable distance of vehicle travel depending on the speed of the vehicle, means controlled from the trackway for setting said means into operation when a restrictive indication is received, apparatus on the vehicle for applying the brakes when the operation of said slow-acting means is completed if the speed of the vehicle then exceeds a fixed sub-maximum value, and means on the vehicle for preventing operation of said brake-applying apparatus upon completion of the operation of said slow-acting means even though the vehicle speed then exceeds said fixed value if the brakes have already been applied manually by the operator of the vehicle.

18. Railway traffic controlling apparatus comprising means on a vehicle controlled from the trackway and effective under restrictive traffic conditions to cause an automatic application of the brakes if the speed of the vehicle exceeds a fixed sub-maximum speed, slow-acting means on the vehicle set into operation when an indication of restrictive traffic conditions is received for delaying the automatic brake application for a variable distance of vehicle travel depending on speed, and means for preventing an automatic brake application at the end of said distance even though the speed exceeds said fixed value if the brakes have already been applied by the operator of the vehicle.

19. Railway traffic controlling apparatus comprising means on a vehicle controlled from the trackway and effective under restrictive traffic conditions to cause an automatic application of the brakes if the speed of the vehicle exceeds a fixed sub-maximum speed, slow-acting means on the vehicle set into operation when an indication of restrictive traffic conditions is received for delaying the automatic brake application for a variable distance of vehicle travel depending on speed, and means for preventing an automatic brake application at the end of said distance even though the speed exceeds said fixed value if the engineer's brake valve handle is then in brake-applying position.

20. Railway traffic controlling apparatus comprising means on a vehicle controlled from the trackway and effective under restrictive traffic conditions to cause an automatic application of the brakes if the speed of the vehicle exceeds a fixed sub-maximum speed, slow-acting means on the vehicle set into operation when an indication of restrictive traffic conditions is received for delaying the automatic brake application for a variable distance of vehicle travel depending on speed, and means for preventing an automatic brake application at the end of said distance even though the speed exceeds said fixed value if a brake application of given force has already been made by the operator of the vehicle.

21. Railway traffic controlling apparatus comprising vehicle-carried means controlled from the trackway and operating to automatically apply the brakes upon a change from a more favorable to a less favorable traffic condition if the speed of the vehicle exceeds a given value, and means also on the vehicle for delaying such application for a distance of vehicle travel which varies with the speed of the vehicle in such manner that the lower the speed the greater the distance.

22. Railway traffic controlling apparatus comprising vehicle-carried means controlled from the trackway for automatically applying the brakes upon a change from a more favorable to a less favorable traffic condition if the speed of the vehicle exceeds a given value, means for delaying such application for an interval of distance which depends on the speed of the vehicle in such manner that the higher the speed the shorter the distance, and means on the vehicle for preventing such automatic application if the engineer takes suitable action during said interval.

23. Railway traffic controlling apparatus comprising vehicle-carried means controlled from the trackway for automatically applying the brakes upon a change from proceed to caution traffic conditions if the speed of the vehicle exceeds a given value, means for delaying such application for a distance interval which varies with speed in such manner that the lower the speed the greater the distance, and means on the vehicle for preventing such automatic application if the engineer takes suitable action during said delay.

24. Railway traffic controlling apparatus comprising a vehicle, means thereon arranged to change from an initial condition to an ultimate condition in a distance interval which varies with the speed of the vehicle in such manner that the lower the speed the greater the interval, brake applying apparatus set into operation when said means reaches said ultimate condition if the speed of the vehicle exceeds a given value, means controlled from the trackway for setting said means into operation, and mechanism under the control of the engineer for preventing a brake application after said means reaches its ultimate condition.

25. Railway traffic controlling apparatus comprising a vehicle, means thereon arranged to change from an initial condition to an ultimate condition in a distance interval which varies with the speed of the vehicle in such manner that the lower the speed the greater the interval, brake applying apparatus set into operation when said means reaches said ultimate condition if the speed of the vehicle exceeds a given value, means controlled from the trackway for setting said means into operation, and mechanism under the control of the engineer for preventing a brake application after said means reaches its ultimate condition if the engineer takes suitable action prior to the time that said means reaches its ultimate condition.

26. Railway traffic controlling apparatus comprising a vehicle, means thereon responsive to dangerous traffic conditions in advance, apparatus controlled by said means for applying the brakes if the speed of the vehicle exceeds a given value, slow-acting means interposed between said means and said apparatus for preventing an application of the brakes for a variable distance of vehicle travel depending on speed in such manner that the lower the speed the greater the interval, and mechanism for preventing such automatic application of the brakes if the engineer takes suitable action during the operation of said slow-acting means.

In testimony whereof I affix my signature.

FRANK H. NICHOLSON.